United States Patent
Wang et al.

(10) Patent No.: US 10,661,442 B2
(45) Date of Patent: May 26, 2020

(54) CALIBRATION ARTICLE FOR A 3D VISION ROBOTIC SYSTEM

(71) Applicant: ABB Schweiz AG, Baden (CH)

(72) Inventors: Jianjun Wang, West Hartford, CT (US); Remus Boca, Simsbury, CT (US); Biao Zhang, West Hartford, CT (US)

(73) Assignee: ABB Schweiz AG, Baden (CN)

( * ) Notice: Subject to any disclaimer, the term of this patent is extended or adjusted under 35 U.S.C. 154(b) by 81 days.

(21) Appl. No.: 15/424,058

(22) Filed: Feb. 3, 2017

(65) Prior Publication Data

US 2018/0222055 A1    Aug. 9, 2018

(51) Int. Cl.
*B25J 9/16* (2006.01)

(52) U.S. Cl.
CPC ........... *B25J 9/1692* (2013.01); *B25J 9/1697* (2013.01); *G05B 2219/39016* (2013.01)

(58) Field of Classification Search
CPC .................. B25J 9/1697; B25J 9/1962; G05B 2219/39016
See application file for complete search history.

(56) References Cited

U.S. PATENT DOCUMENTS

| | | | |
|---|---|---|---|
| 9,863,351 B2* | 1/2018 | Yamaguchi | B60T 13/145 |
| 9,932,024 B2* | 4/2018 | Kinoshita | B60T 7/042 |
| 9,952,044 B2* | 4/2018 | Gatton | G01B 3/30 |
| 2005/0068523 A1* | 3/2005 | Wang | G01B 11/2504 356/243.1 |
| 2005/0133718 A1* | 6/2005 | Miyamoto | G01B 15/04 250/307 |
| 2007/0164219 A1* | 7/2007 | Shishido | H01J 37/263 250/310 |
| 2008/0252248 A1 | 10/2008 | Lundberg et al. | |
| 2011/0162434 A1 | 7/2011 | Rastogi | |
| 2011/0280472 A1* | 11/2011 | Wallack | B25J 9/1692 382/153 |
| 2012/0257217 A1* | 10/2012 | Southwood | G01B 11/303 356/600 |
| 2013/0201346 A1* | 8/2013 | Kanno | B25J 9/1697 348/169 |
| 2016/0094840 A1 | 3/2016 | Warner | |
| 2016/0223325 A1 | 8/2016 | Rohit et al. | |

FOREIGN PATENT DOCUMENTS

WO    20160094840    12/2015
WO    WO2015197100 A1    12/2015

OTHER PUBLICATIONS

International Search Report and Written Opinion, PCT Appln. No. PCT/US2018/16898, 10 pgs.
International Preliminary Report on Patentability cited in corresponding PCT/US2018/016898 dated Aug. 6, 2019 (8 pages).

* cited by examiner

*Primary Examiner* — Rachid Bendidi
(74) *Attorney, Agent, or Firm* — Taft Stettinius & Hollister LLP; J. Bruce Schelkopf

(57) ABSTRACT

A calibration article is provided for calibrating a robot and 3D camera. The calibration article includes side surfaces that are angled inward toward a top surface. The robot and camera are calibrated by capturing positional data of the calibration article relative to the robot and the camera. The captured data is used to generate correlation data between the robot and the camera. The correlation data is used by the controller to align the robot with the camera during operational use of the robot and camera.

20 Claims, 4 Drawing Sheets

CALIBRATION ARTICLE FOR A 3D VISION ROBOTIC SYSTEM

BACKGROUND

The present inventions relate generally to robotic systems, and more particularly, to calibration of a 3D vision system for a robot.

Robotic systems come in a variety of forms for numerous applications. While robotic systems can be programmed to operate without positional feedback, it is preferable to provide robotic systems with a vision system that provides the robot with information about the work space. For instance, a vision system can be used to locate a work piece within the work space. The robot's movement to interact with the work piece can then be guided by the vision system to accommodate variations in work piece location and/or orientation within the work space.

However, one problem with robotic systems equipped with vision systems is a lack of coordination between the robot and the vision system. That is, the robot functions within its work space according to various movement controls, and the vision system views a work piece within its own separate camera space. While the work space of the robot and the camera space of the vision system necessarily overlap to provide the desired robot guidance, the work space and camera space are not always aligned with each other. Thus, the location of a work piece as viewed by the camera in the camera space may not match the actual position of the work piece in the work space. Such misalignments can cause inaccurate robot movements and lower work quality of the robot or cause other problems.

SUMMARY

A calibration article and method of using the article to calibrate a robot and 3D camera is described. The calibration article includes side surfaces and a top surface. The side surfaces are angled inward toward the top surface, and at least some of the side surfaces are angled at different angles. Thus, at least two of the side surfaces are distinguishable from each other. The robot and camera are moved to one or more positions where data is captured of the side surfaces and top surface and the positions of the robot and camera relative thereto. The captured data is used to generate correlation data that aligns the robot and the camera with each other. Subsequently, the correlation data is used for transformations between positions in camera space and robot space during operational use of the robot and camera.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
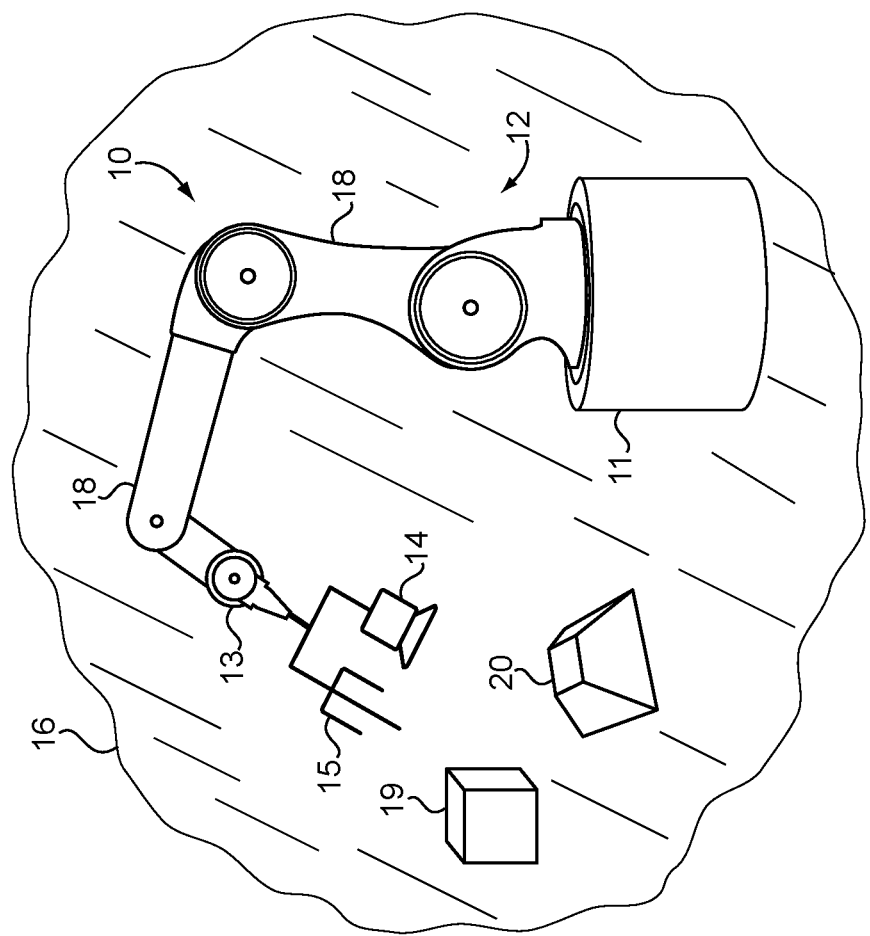
FIG. 1 is a view of a calibration system, showing a robot, camera and calibration article.

Referring now to the figures, and particularly FIG. 1, a calibration system 10 with a robot 12 and 3D vision 14 is shown. While the robot 12 can take many forms and can be used in numerous applications, the robot 12 is preferably capable of moving in three dimensions within a work space. As shown, the robot 12 is mounted to a work surface 16, although the robot 12 can be mounted or otherwise positioned in any conventional manner. The robot 12 may be provided with a series of interconnected, movable links 18 to allow the robot 12 to move within the work space. The links 18 may be moved with electric motors, hydraulics or any known system for causing robot 12 movement. Preferably, robot 12 movement will be directed by a programmable controller that retrieves pre-defined robot 12 movements from memory storage. To perform useful tasks on a workpiece 19, a gripper 15 is typically mounted on the robot end effector 13. The particulars of the robot 12 and its control are well understood by those of ordinary skill in the art and need not be described in detail herein.

A vision system 14 is also provided. The vision system 14 includes a 3D camera 14 that is capable of viewing objects in three dimensions within the camera space of the camera 14. Numerous types of 3D cameras 14 exist and may be used with the robot 12. Conventional 3D cameras 14 can use infrared beams, laser beams or stereoscopy. While photography cameras typically output a human viewable image of a scene, the 3D camera 14 need not produce a human readable image. Typically, the output of the camera 14 will be point cloud data that records three dimensional data for a finite number of points on the various surfaces of the objects in the camera space. As shown in FIG. 1, the camera 14 is preferably mounted on the robot end effector 13 and moves with the robot 12 as the robot 12 moves within the work space. Thus, in this embodiment, the camera space associated with the camera 14 moves as the robot 12 moves. Alternately, the camera 14 may be mounted at a stationary location or on a different movable structure, such as a second robot. However, in either arrangement, the robot 12 and the camera 14 are linked by a central controller.

Figure 2:
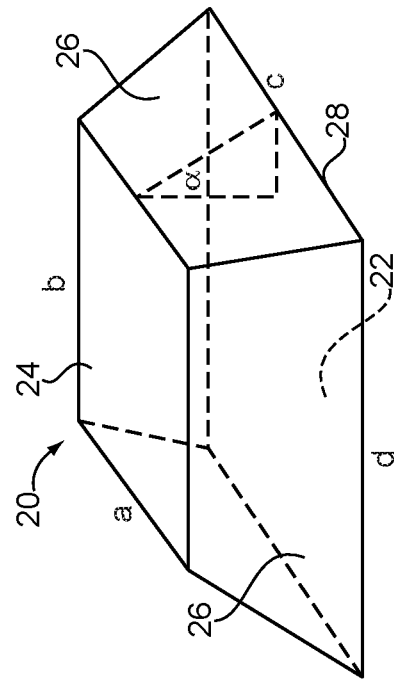
FIG. 2 is a perspective view of the calibration article.

In order to provide accurate transformation between the robot 12 work space and the camera space of the 3D camera 14, a calibration article 20 is provided. The calibration article 20 is shown generally in FIG. 1 and in more detail in FIGS. 2 and 3. Although the article 20 could be mounted on or rest upon a raised support structure, the article 20 is shown in FIG. 1 with a flat bottom surface 22 resting on a flat work surface 16.

A coordinate frame {OXYZ} may be attached to the robot base 11 (b), the robot end effector 13 (e), the camera 14 (c), and the calibration article 20 (a), respectively. The coordinate frames may be designated as $\{OXYZ\}_b$, $\{OXYZ\}_e$, $\{OXYZ\}_c$ and $\{OXYZ\}_a$. The relationship between any two coordinate frames can be represented by a 4 by 4 transformation matrix $T_r^s$, which is essentially the position and orientation of coordinate frame s in coordinate frame r. With this transformation matrix, the coordinates of any point P in coordinate frame r can be obtained from its coordinates in coordinate frame s with the equation:

$$\begin{bmatrix} x \\ y \\ z \\ 1 \end{bmatrix}_r = T_r^s \begin{bmatrix} x \\ y \\ z \\ 1 \end{bmatrix}_s \quad (1)$$

In FIG. 1, the transformation relationship to be calibrated between the camera 14 space and robot 12 space is represented by $T_e^c$, which defines the position and orientation of the camera 14 frame c in relation to the robot end effector 13 frame e. Once $T_e^c$ is known, the position and orientation of any object (p) detected in the camera 14 space can be converted to the robot 12 space using:

$$T_b^p = T_b^e * T_e^c * T_c^p \quad (2)$$

where $T_b^p$ and $T_c^p$ are the positions and orientations of an object (p) in relation to the robot base 11 frame b and the camera 14 frame c, respectively, and $T_b^e$ is the position and orientation of the robot end effector 13 frame e in relation to the robot base 11 frame b. $T_b^e$ will typically be programmed into and provided by the robot 12 controller.

The calibration article 20 is designed to allow the vision system 14 to easily and accurately determine the position and orientation of the calibration article 20 from captured images with respect to the camera 14 frame c. In one embodiment, the calibration article 20 may be thought of as a truncated pyramid or a frustum. However, because a conventional frustum is defined as the portion of a pyramid between two parallel planes, some embodiments of the calibration article 20 may not be considered to be a frustum since it may be desirable for the top surface 24 to be non-parallel with the bottom surface 22. Alternatively, the bottom surface 28 may be used herein in place of the top surface 24.

While the calibration article 20 may have four or more side surfaces 26 adjoined to adjacent side surfaces 26 at opposing sides of each side surface 26, it may be preferable for the calibration article 20 to have only four side surfaces 26. That is, in some embodiments, the calibration article 20 may have five, six, seven or eight side surfaces 26, but the calibration article 20 preferably has at least four side surfaces 26 and may have no more than four side surfaces 26. As shown, the side surfaces 26 may be adjoined along the bottom edges to the bottom surface 22 and may be adjoined along the top edges to the top surface 24.

As shown, the side surfaces 26 are preferably angled inward from the bottom surface 22 to the top surface 24. Thus, the side surfaces 26 are angled inward toward the top surface 24. One feature of the calibration article 20 is that at least some of the side surfaces 26 are angled inward at different angles relative to each other. Thus, the calibration article 20 is asymmetrical in at least some respect. For example, when at least two of the side surfaces 26 are compared to each other, the side surfaces 26 are oriented at different angles relative to the top surface 24 and/or the bottom surface 22. In order to provide further distinctions between each of the side surfaces 26, it may also be desirable for at least three of the side surfaces 26 to be angled at different angles relative to each other, or for at least four of the side surfaces 26 to be angled at different angles relative to each other. Where the top surface 24 and the bottom surface 22 are parallel to each other, the angles may be measured from the top surface 24 or the bottom surface 22. Where the top surface 24 and the bottom surface 22 are non-parallel, it is preferable to measure the angles from the bottom surface 22; however, the angles may alternately be measured from the top surface 24.

Figure 3:
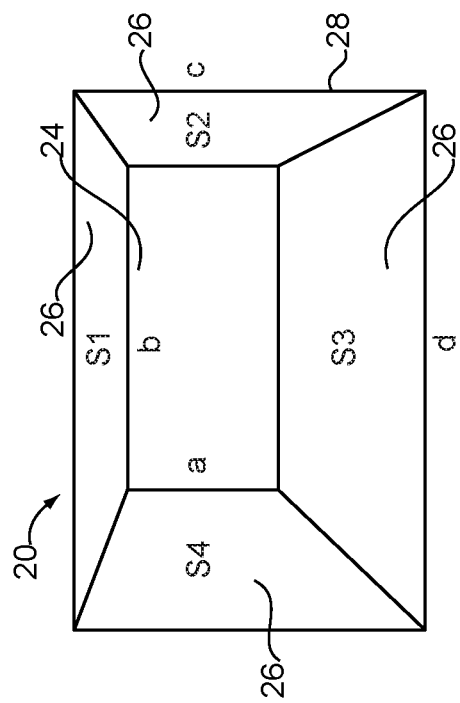
FIG. 3 is a top view of the calibration article.

As shown in FIG. 3, the shape of the calibration article 20 allows at least two or more of the side surfaces 26 to be distinguished from each other. In the particular embodiment of FIG. 3, the base 28 (as defined by the bottom edges of the side surfaces 26) is rectangular and the top surface 24 is also rectangular and aligned with the base 28. Thus, one side d, b of the base 28 and top surface 24 is longer than another side c, a of the base 28 and top surface 24. Further, in FIG. 3, the top surface 24 is shifted off-center relative to the base 28. Thus, each of the side surfaces S1, S2, S3, S4 are distinguishable from each other by the length of the bottom edge c, d; the length of the top edge a, b; or the inward angle of the side surfaces S1, S2, S3, S4 relative to each other. Preferably, the angle of each side surface 26 falls within a range of 30° and 75° from a vertical plane through the base 28. That is, it is preferable for the side surfaces 26 to not be overly vertical in orientation (i.e., 75° or less), and it is also preferable for the side surfaces 26 to not be overly horizontal or flat in orientation (i.e., 30° or more). As shown in FIG. 3, it is also preferable for the side surfaces 26 and the top surface 24 to be planar in shape. Even more preferably, the side surfaces 26 and top surface 24 are completely flat and do not have any recesses or protrusions thereon. While the side surfaces 26, top surface 24 and bottom surface 28 may otherwise be the same as each other, it is also possible that one or more of the side surfaces 26, top surface 24, and/or bottom surface 28 may be colored differently from each other or may have one or more patterned surfaces thereon (e.g., a checkerboard pattern).

Figure 4:
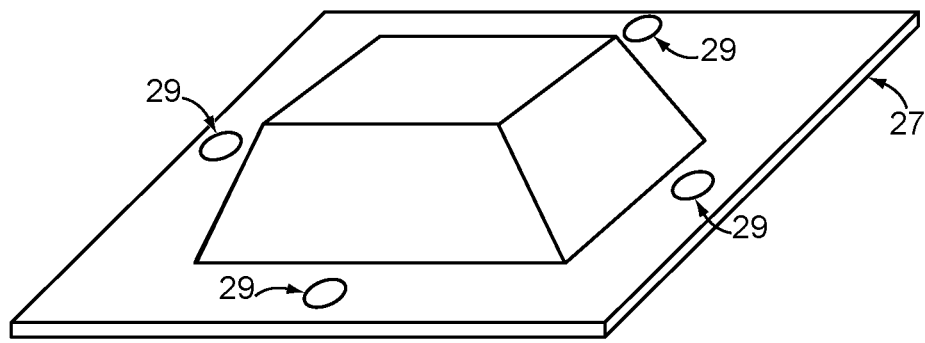
FIG. 4 is a perspective view of a mounting system for the calibration article.

FIG. 4 shows how the calibration article 20 may be mounted within the work space. The mounting plate 27 is preferably a planar plate extending outward from the bottom of the side surfaces 26. The shape of the mounting plate 27 may be rectangular, circular, or any other desired shape. A number of mounting holes 29 may be provided so that screws can be used to fix the mounting plate 27 onto the work surface 16 or other desired mounting location. To fix the calibration article onto the mounting plate 27, the bottom surface 28 and the mounting plate 27 can be provided with a number of matching mounting holes. Alternatively, the mounting plate 27 may be an extension of the bottom surface 28 of the calibration article 20.

Figure 5:
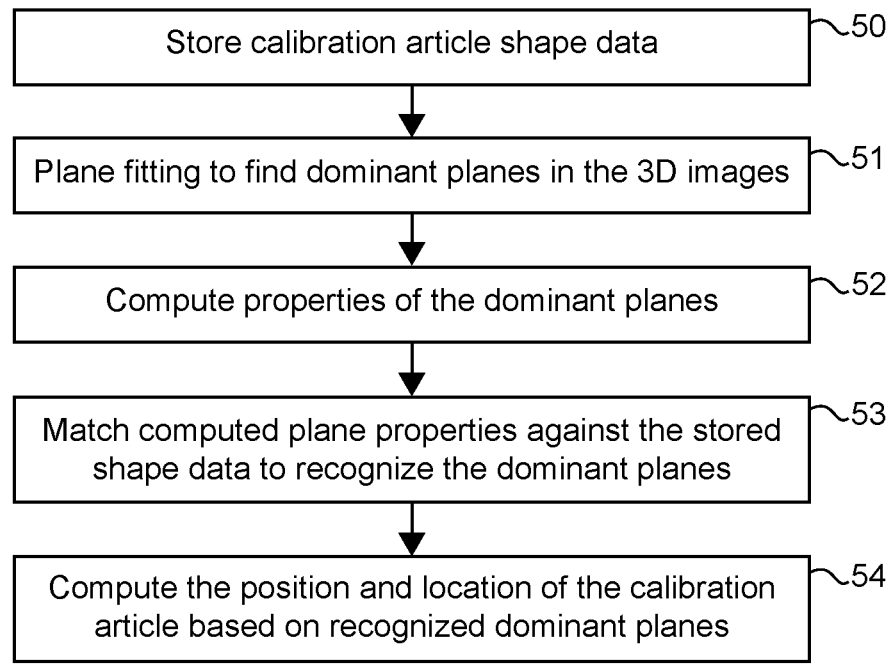
FIG. 5 is a flow chart of a method of determining the position and orientation of the calibration article from captured 3D images.

In use, the shape of the calibration article 20 may be utilized by the vision system 14 to determine the position and orientation of the calibration article 20 from captured images. An example of such a process is shown in FIG. 5. The shape data of the calibration article 20 is preferably stored in computer memory (50) before the start of the calibration process. The particular content and format of the shape data will depend on the programming and/or algorithms that use the data, but the data will typically include three dimensional data defining the 3D positions and orientations of the side surfaces 26 and the top surface 24 relative to each other or to a common surface. The processing of the captured 3D images of the calibration article 20 may use a plane finding algorithm (51). For example, the RANdom SAmple Consensus (RANSAC) plane fitting algorithm may be used for this purpose and is widely available from open source code. A selection criteria may be imposed so that only dominant planes with enough points thereon are found. The next step may be to compute the properties of each of the dominant planes found (52), such as area, width, length, normal, centroid, etc. These properties may then be used in a matching algorithm (53) to compare pre-stored shape data of the calibration article 20 in order to recognize the dominant planes. Thus, the dominant planes identified in steps (51) and (52) are matched with the shape data retrieved from step (50). As a result, the matched identity of each dominant plane on the calibration article 20 allows the position and orientation of the calibration article 20 to be computed (54).

Figure 6:
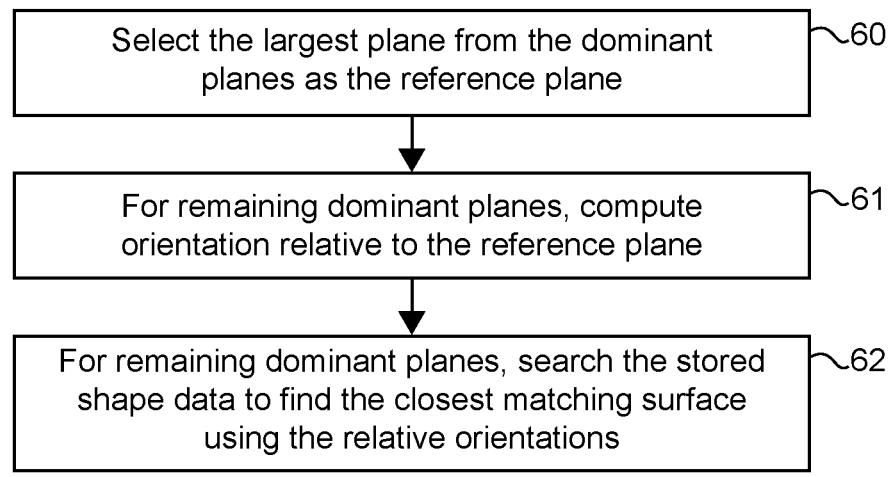
FIG. 6 is a flow chart of a method of recognizing the surfaces of the calibration article from the captured 3D images.

FIG. 6 shows a flow chart of an exemplary matching algorithm. It is noted, however, that there are many ways to perform matching and recognition. Assuming that the mounting plate 27 is the largest plane compared to other surfaces 24, 26 of the calibration article 20, the method of FIG. 6 starts by finding the mounting plate 27 using the largest plane criteria from the dominant planes (60). Using the mounting plate 27 as the common reference surface, the relative orientation of each dominant plane to the mounting plate 27 may then be computed (61). Since each surface 24, 26 of the calibration article 20 can be designed with a distinguishable orientation with respect to the bottom surface 28 and/or the mounting plate 27, each identified dominant plane can be recognized as either one of the surfaces 24, 26 of the calibration article 20, or as a surface that is not on the calibration article 20. For example, the latter case could occur when there are large planes in the background of the camera 14 space. It is also possible to use other computed plane properties as recognition criteria to distinguish similarly oriented planes in the background from the surfaces 24, 26 of the calibration article 20. For example, the distance of the plane centroid to the mounting plate 27 may be used as an additional recognition criteria. Preferably, the matching algorithm uses at least the relative orientations of each surface 24, 26 of the calibration article 20 with respect to the bottom surface 28 retrieved from the stored shape data in order to recognize the identified dominant planes.

Computing the position and orientation of the calibration article 20 after recognizing the dominant planes in the captured 3D images of the calibration article 20 can be done in numerous ways. For example, one method is least squares fitting. In this method, the pre-stored shape data of the calibration article 20 may include the plane equation parameter $[n_x, n_y, n_z, d]_a$ for each surface with respect to the coordinate frame of the calibration article 20:

$$[n_x \quad n_y \quad n_z \quad d]_a \begin{bmatrix} x \\ y \\ z \\ 1 \end{bmatrix}_a = 0 \quad (3)$$

where $<n_x, n_y, n_z>$ is a unit vector representing the normal plane, d is the distance of the origin of the calibration article 20 frame a to the identified dominant plane. The position and orientation of the calibration article 20 may be defined as $T_c^a$ with respect to the camera 14 frame c, then the plane fitting algorithm in step (51) of FIG. 5 can find the plane with the plane equation parameter $[n_x, n_y, n_z, d]_c$ with respect to the camera 14 frame c:

$$[n_x \quad n_y \quad n_z \quad d]_c \begin{bmatrix} x \\ y \\ z \\ 1 \end{bmatrix}_c = 0 \quad (4)$$

Using the relationship:

$$\begin{bmatrix} x \\ y \\ z \\ 1 \end{bmatrix}_c = T_c^a \begin{bmatrix} x \\ y \\ z \\ 1 \end{bmatrix}_a \quad (5)$$

the plane equations (3) and (4) may be defined as:

$$[n_x, n_y, n_z, d]_c T_c^a = [n_x, n_y, n_z, d]_a \quad (6)$$

Since the number of recognized surfaces is preferably at least three, there will be at least three equations for (6) available to use in a linear least squares fitting to solve for $T_c^a$. Since the bottom surface 28 or the mounting plate 29 may also be recognized, this surface could also be added into the linear least squares fitting to solve for $T_c^a$.

Figure 7:
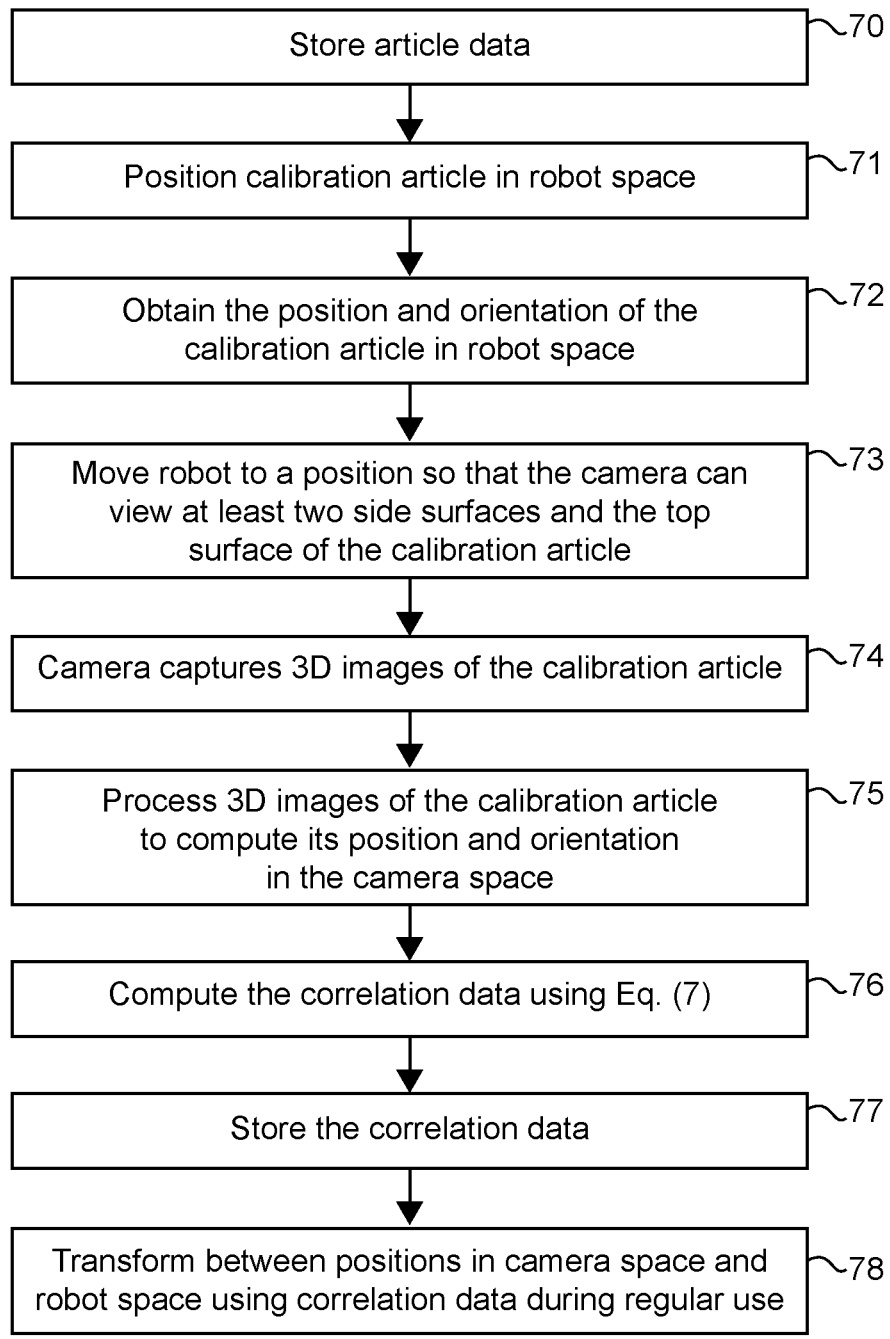
FIG. 7 is a flow chart of a method of calibrating the robot and camera.
Figure 8:
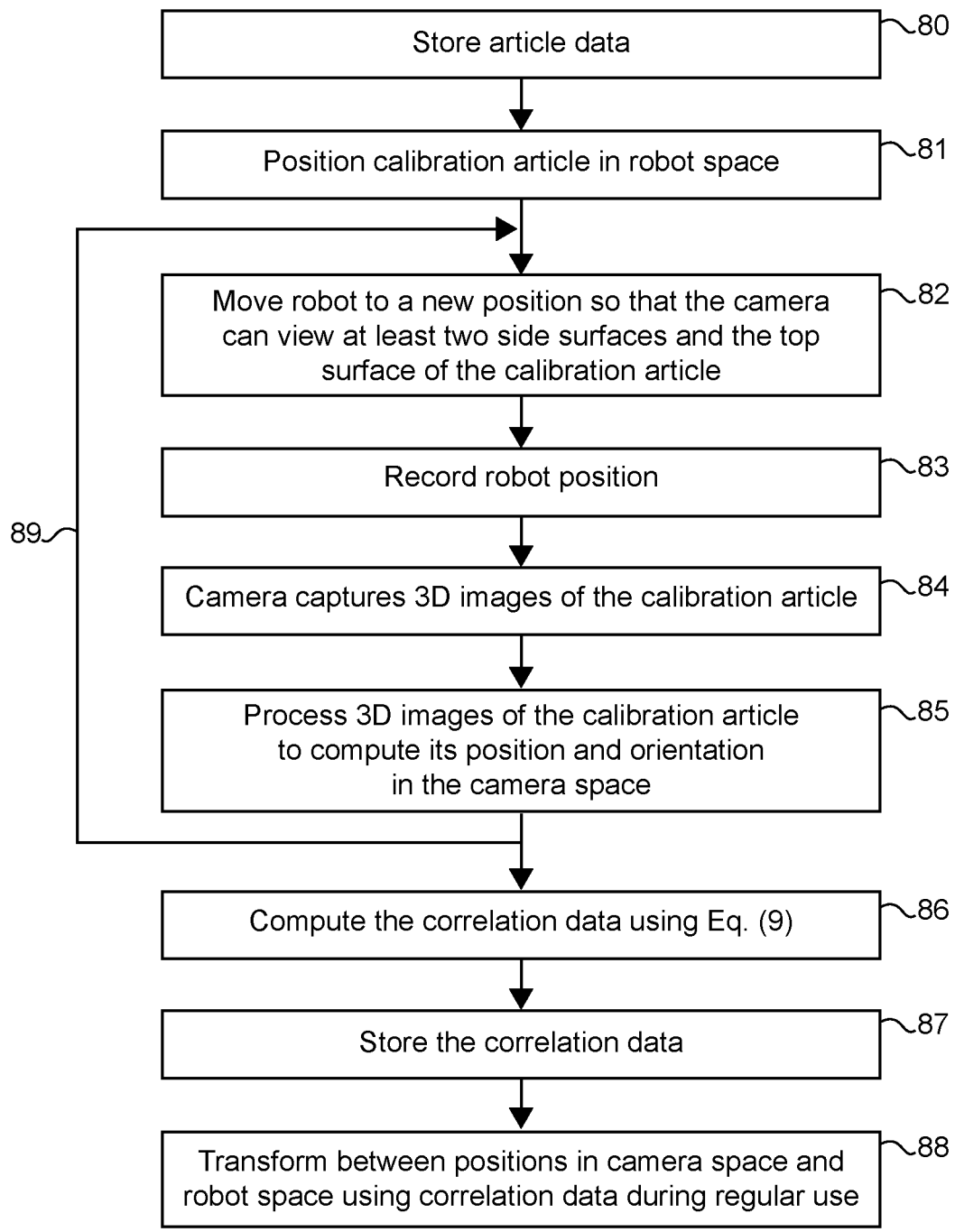
FIG. 8 is a flow chart of another method of calibrating the robot and camera.

Using the algorithms described above for computing the position and orientation of the calibration article 20 from captured images, there are various ways to use the calibration article 20 to calibrate the geometric relationship between the robot 12 space and the camera 14 space using the calibration article 20. FIGS. 7 and 8 show two possible methods. As previously described, it is preferable for 3D data defining the shape of the calibration article 20 to be initially stored in computer memory (70, 80). In order to begin the calibration process, it is also necessary to position the calibration article 20 in a location that is within the robot 12 work space and within the camera 14 space of the 3D camera 14 (71, 81).

The mathematic foundation of camera 14 to robot 12 calibration may be based on a closed kinematic chain:

$$T_b^a = T_b^e(\theta) * T_e^c * T_c^a(\theta) \quad (7)$$

where θ is the measurement of robot joint angles, $T_b^e$ is the position and orientation of the robot end effector 13 in relation to the robot base 11 frame b and is provided by the robot controller through a forward kinematics calculation as:

$$T_b^e(\theta) = f(\theta, M) \quad (8)$$

with M being the robot kinematic model parameters, including the arm link 18 lengths, the initial joint positions, and other factors; $T_c^a$ is the position and orientation of the calibration article 20 in relation to the camera 12 frame c as computed in FIG. 5 in a view configuration defined by θ; and $T_b^a$ is the position and orientation of the calibration article 20 in relation to the robot base 11 frame b.

It is noted that Equation (7) is valid for a robotic system shown in FIG. 1 where the camera is mounted on the robot end effector 13. For other system configurations, different equations could be used. As shown in FIG. 7, if the position and orientation of the calibration article 20 in robot 12 space, $T_b^a$, is obtained by using other methods, such as optical sensing or manual touching (72), then Equation (7) would only have one unknown matrix, $T_e^c$, which could be solved using just one equation for (7). This would mean that the camera 14 only needs to capture the calibration article 20 in one viewing angle. This viewing angle should be chosen by positioning the robot 12 in a location where the camera 14 can view at least two side surfaces 26 and the top surface 24 of the calibration article 20 (73). In addition, to use the method of FIG. 5, the mounting plate 27 is also preferably visible and may be the largest plane in the image. The camera 14 then captures 3D images of the calibration article 20 (74), and the system computes the position and orientation of the calibration article 20 in the camera 14 space from the captured images (75).

If the position and orientation of the calibration article 20 in robot 12 space, $T_b^a$, is unknown, then Equation (7) will have two unknown matrices, $T_e^c$ and $T_b^a$. To solve them, at least two instances of Equation (7) are required, which means at least two camera 14 view angles are needed. As shown in FIG. 8, more than two camera 14 view angles will typically be used in practice to reduce measurement noise and increase robustness. This can be achieved by moving the robot 12 to N different positions (89), where at each position the camera 14 can view at least two side surfaces 26 and the top surface 24 of the calibration article 20 (82), record the position of the robot (83), capture a 3D image (84), and detect position and orientation (85). In the end, N equations can be obtained using Equation (7) as:

$$T_b^a = T_b^e(\theta^{(i)}) * T_e^c * T_c^a(\theta^{(i)}), i=1 \ldots N \quad (9)$$

where $\theta^{(i)}$ is the robot joint angles at the $i^{th}$ view position, $T_c^a(\theta^{(i)})$ is the detected position and orientation of the calibration article 20 in the camera 14 frame cat the $i^{th}$ view position. Equation (9) has two unknowns $T_e^c$ and $T_b^a$, which can be solved using a standard linear least squares algorithm, or other known algorithms. This method is also known as hand-eye calibration.

After calibration, the correlation data is used in the form of Equation (2). That is, after the correlation data has been generated (76, 86), positional data captured by the camera 14 through viewing a work piece can be transformed with the correlation data into a precise location of the robot 12 relative to the robot base 11 frame b. Thus, after the calibration routine is complete, the correlation data is preferably stored in memory (77, 87) and used by the system (78, 88) during regular operation of the robot 12 and vision 14 systems for transforming positions between camera space and robot space.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method of calibrating a three dimensional (3D) vision robotic system, comprising:
storing 3D shape data of a calibration article in memory;
positioning the calibration article within a work space of a robot, wherein the calibration article comprises at least four side surfaces and a top or bottom surface, all of the at least four side surfaces being angled inward together toward one of the top or bottom surface with at least two side surfaces of the at least four side surfaces both being angled inward together toward the one of the top or bottom surface at different angles from each other;
positioning a 3D camera mounted on the robot in a viewing position, the 3D camera being positioned in the viewing position with the robot, wherein at least two of the side surfaces angled at different angles and the top or bottom surface are viewable in the viewing position;
capturing a 3D image in the viewing position with the 3D camera, the 3D image comprising positional data corresponding to the viewable side surfaces and top or bottom surface in the viewing position;
generating calibration data from the 3D image and the 3D shape data; and
transforming between positions of the robot and the camera with a controller during use thereof based upon the calibration data generated from the 3D image.

2. The method according to claim 1, wherein the 3D camera is positioned in at least two viewing positions, one of the 3D images being captured in each of the two viewing positions, and the calibration data is generated from the 3D images from each viewing position.

3. The method according to claim 1, wherein at least three of the side surfaces are angled inward at different angles from each other.

4. The method according to claim 3, wherein at least four of the side surfaces are angled inward at different angles from each other.

5. The method according to claim 1, wherein the calibration article comprises no more than four side surfaces.

6. The method according to claim 5, wherein the top surface is rectangular and a base of the side surfaces is rectangular.

7. The method according to claim 1, wherein the side surfaces are angled 30° to 75° from a vertical plane.

8. The method according to claim 1, wherein the side surfaces and the top surface are each planar.

9. The method according to claim 8, wherein the side surfaces and the top surface lack recesses or protrusions thereon.

10. The method according to claim 1, wherein the side surfaces are adjoined to the top surface and each side surface is adjoined to another side surface on opposite sides thereof.

11. The method according to claim 1, wherein the side surfaces are adjoined to a bottom surface, the bottom surface being flat and adapted to rest on a flat surface.

12. The method according to claim 1, further comprising a mounting plate extending outward from a bottom of the side surfaces.

13. The method according to claim 12, wherein the mounting plate defines the largest plane of the calibration article.

14. The method according to claim 1, wherein the calibration article comprises no more than four side surfaces, and each of the four side surfaces are angled inward at different angles from each other.

15. The method according to claim 14, wherein the side surfaces are angled 30° to 75° from a vertical plane, and the side surfaces and the top surface are each planar.

16. The method according to claim 15, wherein the side surfaces are adjoined to the top surface and each side surface is adjoined to another side surface on opposite sides thereof.

17. The method according to claim 16, wherein the side surfaces and the top surface lack recesses or protrusions thereon.

18. The method according to claim 17, wherein the top surface is rectangular and a base of the side surfaces is rectangular, and the side surfaces are adjoined to a bottom surface, the bottom surface being flat and adapted to rest on a flat surface.

19. The method according to claim 1, wherein at least one of the side surfaces and the top or bottom surface has a pattern thereon.

20. The method according to claim 1, wherein at least one of the side surfaces and the top or bottom surface has a distinguishable color thereon.

\* \* \* \* \*